(12) United States Patent
Kundu et al.

(10) Patent No.: US 11,025,640 B2
(45) Date of Patent: *Jun. 1, 2021

(54) VERIFICATION OF GEOLOCATION OF DEVICES IN A CLOUD DATA CENTER

(71) Applicant: International Business Machines Corporation, Armonk, NY (US)

(72) Inventors: Ashish Kundu, Elmsford, NY (US); Dimitrios Pendarakis, Westport, CT (US); David R. Safford, Clifton Park, NY (US)

(73) Assignee: International Business Machines Corporation, Armonk, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 16/667,860

(22) Filed: Oct. 29, 2019

(65) Prior Publication Data

US 2020/0067941 A1 Feb. 27, 2020

Related U.S. Application Data

(63) Continuation of application No. 15/396,914, filed on Jan. 3, 2017, now Pat. No. 10,516,676.

(51) Int. Cl.
*H04L 29/06* (2006.01)
*G06F 9/50* (2006.01)

(52) U.S. Cl.
CPC .......... *H04L 63/107* (2013.01); *G06F 9/5077* (2013.01); *H04L 63/0428* (2013.01)

(58) Field of Classification Search
CPC . H04L 63/107; H04L 63/0428; G06F 9/5077; G06F 2221/2111; G06F 21/10; G06F 21/6218
See application file for complete search history.

(56) References Cited

U.S. PATENT DOCUMENTS

| | | |
|---|---|---|
| 9,142,086 B2 | 9/2015 | Porco |
| 9,467,811 B2 | 10/2016 | Nilsson et al. |
| 9,967,750 B1 | 5/2018 | Fernandez et al. |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Samson B Lemma
*Assistant Examiner* — Abdullah Almamun
(74) *Attorney, Agent, or Firm* — Law Office of Jim Boice (57) ABSTRACT

A method alters a computer resource in response to the computer resource moving from a first geolocation to a second geolocation. One or more processors receive a message indicating that a computer resource has moved from a first geolocation to a new geolocation. In response to receiving the message that the computer resource has moved from the first geolocation to the new geolocation, the processor(s) encrypt data that is stored on the computer resource, and apply decryption information to the encrypted data from the new geolocation, where the decryption information is specifically for decrypting encrypted data at the new geolocation. In response to the decryption information failing to decrypt the encrypted data at the new geolocation, the processor(s) and/or a user alter the computer resource.

20 Claims, 5 Drawing Sheets

(56) References Cited

U.S. PATENT DOCUMENTS

| | | | |
|---|---|---|---|
| 10,129,353 B2* | 11/2018 | Allen | H04L 63/0281 |
| 2008/0226070 A1 | 9/2008 | Herz | |
| 2009/0235076 A1* | 9/2009 | Morgan, III | G06F 21/6209 |
| | | | 713/171 |
| 2012/0212323 A1 | 8/2012 | Skaaksrud et al. | |
| 2012/0331527 A1* | 12/2012 | Walters | G06F 21/6218 |
| | | | 726/4 |
| 2013/0117801 A1 | 5/2013 | Shieh et al. | |
| 2013/0238789 A1 | 9/2013 | Bade et al. | |
| 2013/0326614 A1 | 12/2013 | Truskovsky et al. | |
| 2014/0380425 A1 | 12/2014 | Lockett et al. | |
| 2015/0038114 A1 | 2/2015 | Low et al. | |
| 2016/0171238 A1* | 6/2016 | Sibillo | H04W 4/029 |
| | | | 713/164 |
| 2017/0126404 A1 | 5/2017 | Unagami et al. | |
| 2017/0195339 A1* | 7/2017 | Brown | H04L 63/107 |
| 2017/0279733 A1 | 9/2017 | Marshall et al. | |
| 2018/0367988 A1* | 12/2018 | Kumar | H04W 4/02 |
| 2019/0230094 A1* | 7/2019 | Pletea | H04L 63/0428 |

OTHER PUBLICATIONS

Luo, Wanying et al, "Veriplace: A Privacy-Aware Location Proof Architecture", University of Waterloo, 2010, Research Gate, pp. 23-32.

USPTO, Non-Final Office Action for Parent U.S. Appl. No. 15/396,914, dated Nov. 30, 2018.

USPTO, Interview Summary Regarding Parent U.S. Appl. No. 15/396,914, dated May 13, 2019.

IBM, "List of IBM Patents or Patent Applications Treated as Related", Oct. 29, 2019.

* cited by examiner

FIG.5

VERIFICATION OF GEOLOCATION OF DEVICES IN A CLOUD DATA CENTER

BACKGROUND

The present disclosure relates to the field of computing devices, and specifically to computer resources utilized by computing devices. More specifically, the present disclosure relates to modifying a computer resource in response to a geophysical movement of the computer resource.

SUMMARY

A method alters a computer resource in response to the computer resource moving from a first geolocation to a second geolocation. One or more processors receive a message indicating that a computer resource has moved from a first geolocation to a new geolocation. In response to receiving the message that the computer resource has moved from the first geolocation to the new geolocation, the processor(s) encrypt data that is stored on the computer resource, and apply decryption information to the encrypted data from the new geolocation, where the decryption information is specifically for decrypting encrypted data at the new geolocation. In response to the decryption information failing to decrypt the encrypted data at the new geolocation, the processor(s) and/or a user alter the computer resource.

The present invention may also be implemented as a computer program product and/or a computer system.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
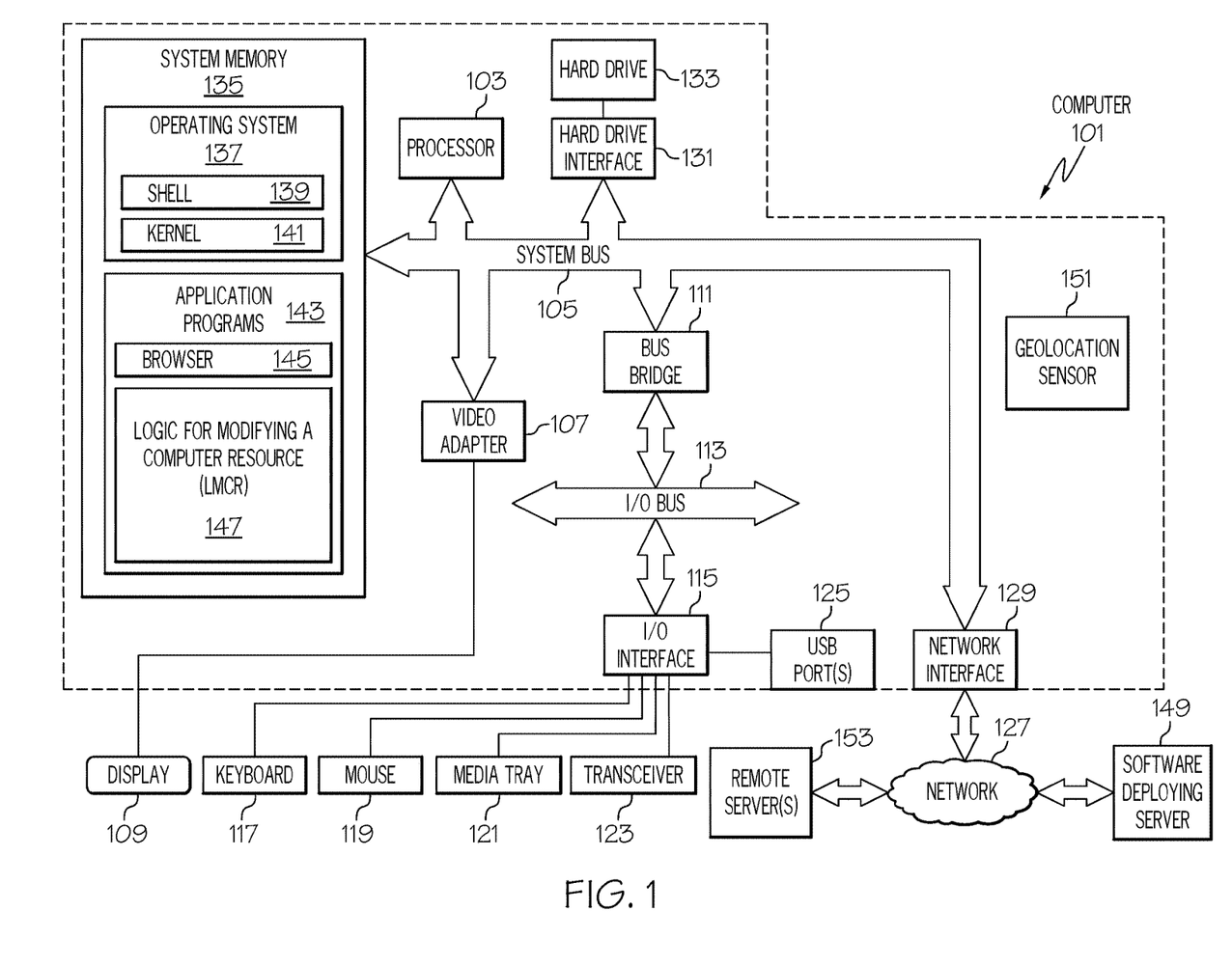
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or remote server(s) 153 shown in FIG. 1 and/or the managing computer 201 and/or the server 253a and/or the server 253b shown in FIG. 2.

Exemplary computer 101 includes a processor 103 that is coupled to a system bus 105. Processor 103 may utilize one or more processors, each of which has one or more processor cores. A video adapter 107, which drives/supports a display 109 (which in one or more embodiments of the present invention is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Modifying a Computer Resource (LMCR) 147. LMCR 147 includes code for implementing the processes described below, including those described in FIGS. 2-3. In one embodiment, computer 101 is able to download LMCR 147 from software deploying server 149, including in an on-demand basis, wherein the code in LMCR 147 is not downloaded until needed for execution. In one embodiment of the present invention, software deploying server 149 performs all of the functions associated with the present invention (including execution of LMCR 147), thus freeing computer 101 from having to use its own internal computing resources to execute LMCR 147.

Also within computer 101 is a geolocation sensor 151, which is able to detect the physical location of computer 101 and/or the orientation of computer 101. For example, geolocation sensor 151 may incorporate global positioning system (GPS) sensors that identify the geophysical location of computer using signals from an array of space-based GPS satellites. Furthermore, location and positioning sensor 151 may identify a static IP address of computer 101, which can be mapped to a physical location.

Also in communication with computer 101 are remote server(s) 153, which may contain a hardware device (e.g., a server blade, a storage device, a memory, a processor, etc.) or a software resource (e.g., an application, database, one or more electronic files (e.g., text files, video files, audio files, etc.), a virtual machine, etc.) that may be migrated from one of the remote server(s) 153 to another of the remote server(s) 153.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

The terms "location", "geophysical location", and "geolocation" are used interchangeably herein to describe a physical location of an object, such as a software resource stored on a storage device and/or used within a computer device, and/or a hardware device used in a server or other computing device.

One or more embodiments of the present provide a method and system for determining the geolocation of a given hardware or software in a given cloud data center. A method is presented to compute the "relative" geolocation of a resource with respect to other resources in the rack or a group of the resources. This method uses cryptography to determine the signature of the group of resources along with the geolocation received from the GPS; the signature is used to verify if one or more resources have been moved away from the group. This method does not require GPS capability to be added to each of the members of the group. Another embodiment of the present invention uses network provenance to determine if a given resource belongs in a particular geolocation.

Thus, one or more embodiments of the present invention determine the geolocation of servers in a data-center/cloud, determine any changes of geolocation of servers due to movement of these servers or their racks using cryptographic group signatures, set membership protocols, or using network provenance protocols as outlined, and/or a combination of any of these methods. Once a resource has been determined to be moved, a set of actions are carried out in order to ensure that this movement is authorized; a policy-based enforcement of geological movement and corresponding restrictions may also be imposed by these actions. In the latter condition, if a server is being moved to another location that is outside the given radius or distance metrics or outside a perimeter defined by various geolocation parameters, then such a movement raises an alert, increases the risk of that server that is notified to the data-center administrators, and also restricts the server to be moved further without any other authorization. If the server is moved, it is determined by the methods outlined or other methods that can be used, and the capacity of the server is modified accordingly.

Moreover, the encryption and decryption protocols for network packets for the data-center servers are location-dependent.

As described herein, the present invention provides a solution to appropriately modifying a computer resource that has moved to a new geophysical location based on that new geophysical location.

For example, a software resource (e.g., a text file, a database file, an audio file, a video file, a virtual machine (i.e., software that emulates a physical machine), etc.) may move from one physical location to another (e.g., from one data center to another data center, from one server blade to another server blade, from one country to another country, etc.). This movement (i.e., "migration") may be physical (e.g., physically moving a storage drive from one physical location to another physical location) or electronic (e.g., transmitting the file over a network from one physical location to another physical location).

Similarly, a hardware device may move from one physical location to another. For example, a server blade, processor, storage device, memory, etc. may be physically moved from one server slot to another server slot, from one cloud-based service center to another cloud-based service center, from one country to another country, etc.

When such a movement/migration occurs, there may be policies and regulatory requirements with the old and/or new locations. For example, when a file is within a geographical space (represented by a set of geolocations or a geometrical shape and associated geographical coordinates), it may remain unencrypted. However, when it goes out of that geographical space, to another location which is outside of the space, it must remain encrypted. Another example would be as follows: assume that an electronic medical record (EMR) file for a patient is stored in a first country that has no regulations regarding storage/sharing of EMR files (i.e., the EMR can be stored anywhere and shared with anyone). Assume further that a second country has very strict regulations regarding how the EMR is stored (e.g., encrypted, behind a firewall, etc.) and shared (e.g., with only predefined designated accessing parties). Thus, if an unencrypted/unsecured EMR is sent from the first country (where such EMRs are permissible) to the second country (where such EMRs are not permissible), then there is a problem. The present invention provides one or more solutions to this problem.

Figure 2:
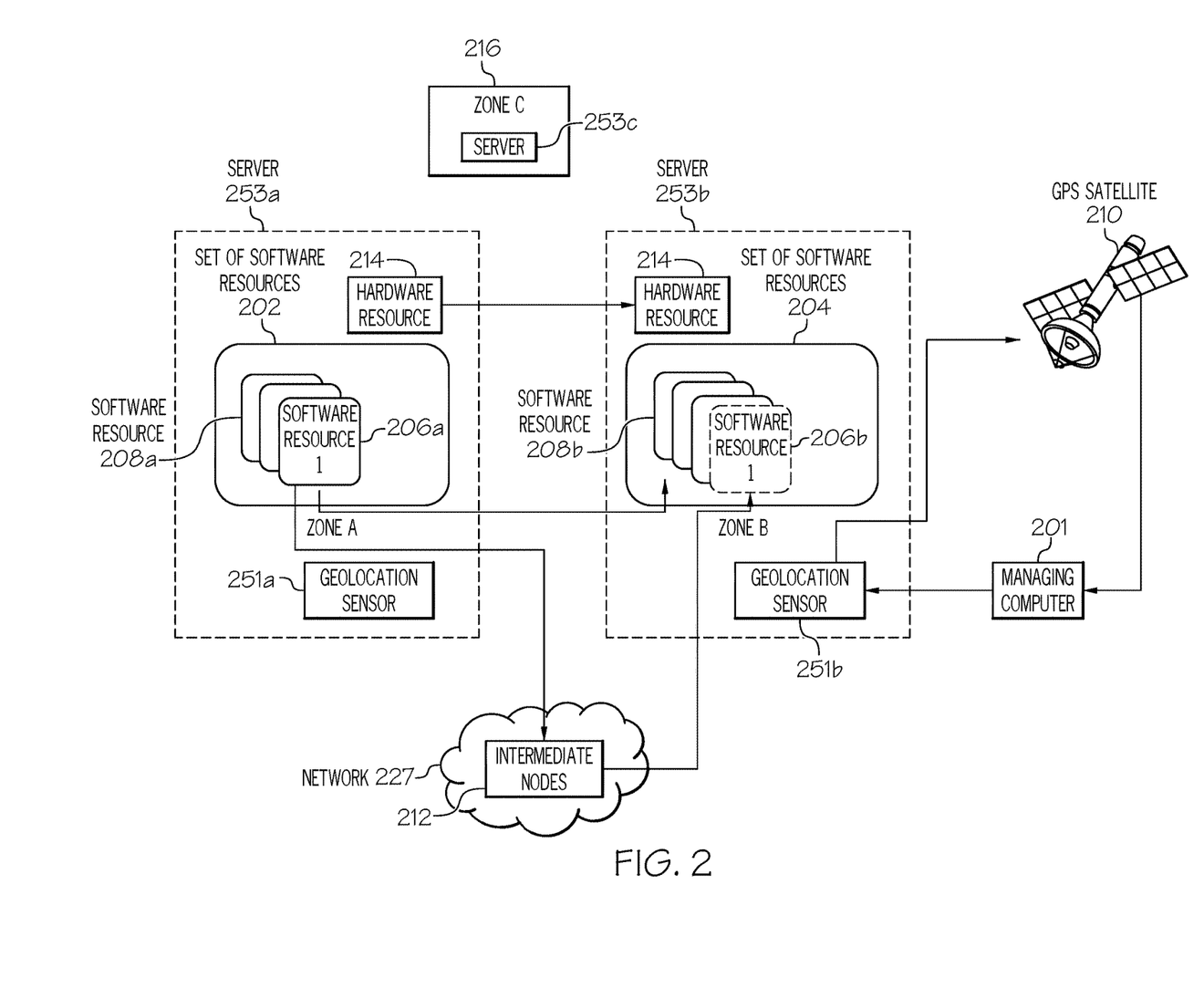
FIG. 2 illustrates a computer resource being relocated to a new geophysical location in accordance with one or more embodiments of the present invention.

With reference now to FIG. 2, assume that a server 253a (analogous to one of the remote server(s) 153 shown in FIG. 1) contains (stores) a set of software resources 202, such as the depicted set of data/software files. The server 253a is located in Zone A, which is a first geophysical location (geolocation).

In one or more embodiments of the present invention, the first geolocation is determined by readings from a geolocation sensor 251a (analogous to geolocation sensor 151 shown in FIG. 1).

Assume now that one of the set of software resources 202 (i.e., software resource 206a) is migrated (copied and/or moved) to a second server 253b (also analogous to another of the remote server(s) 153 shown in FIG. 1) within Zone B (a second geophysical location that is identified by geolocation sensor 251b (also analogous to geolocation sensor 151 shown in FIG. 1). This migration results in software resource 206b residing within the server 253b in Zone B.

In one embodiment, software resource 206a and software resource 206b are a same copy of a same resource. That is, in this embodiment software resource 206a moves from server 253a to server 253b, such that software resource 206a no longer resides within the server 253a.

In one embodiment, software resource 206a and software resource 206b are different copies of a same resource. That is, in this embodiment a copy of software resource 206a (software resource 206b) is stored in server 253b, such that software resource 206a is retained within the server 253a.

In one embodiment of the present invention, the migration from Zone A to Zone B is detected by a transmission path taken by software resource 206a when migrating from Zone A to Zone B (and thus becoming software resource 206b). That is, assume that software resource 206a is transmitted over a network 227 (analogous to network 127 shown in FIG. 1) from server 253a to server 253b via a set of intermediate nodes 212 (e.g., switches, routers, intermediate servers, etc.). Each time software resource 206a passes through one of the intermediate nodes 212, the identity of that intermediate node is captured in a packet header that is transporting the software resource 206a. Thus, the final entry in the packet header will be the identity of the destination server 253b. However, this packet header can be falsified to show that the final destination of the software resource 206a is a location other than Zone B and/or the server 253b. That is, the transmission path described in the packet header can be falsified to show that the software resource 206a is now residing (as software resource 206b) in a server 253c within Zone C, even though software resource 206b is actually residing within server 253b in Zone B.

In one embodiment of the present invention, the locations of server 253a and server 253b are determined by a global positioning system (GPS) satellite 210 interrogating geolocation sensors 251a-251b (when architected as GPS positioning sensors). That is, GPS satellite 210 determines the geophysical location of geolocation sensor 251a and geolocation sensor 251b. However, geolocation sensor 251b could be an untrustworthy geolocation sensor that has been programmed to generate a false location signal. That is, the geolocation sensor 251b can be configured to show that the final destination location of the software resource 206a is a location other than Zone B and/or the server 253b.

Assume now that software resource 206b (or alternatively, hardware resource 214) is not authorized to reside within Zone B, but is authorized to reside within Zone C (identified as element 216 in FIG. 2).

Thus, the present invention presents various methods for determining whether or not the software resource 206a (and/or hardware resource 214) has migrated from server 253a to server 253b (i.e., has migrated from Zone A to Zone B) where software resource 206a and/or hardware resource 214 is not authorized to operate at full capacity, rather that from server 253a to server 253c (i.e., has migrated from Zone A to Zone C) where software resource 206a and/or hardware resource 214 is authorized to operate at full capacity.

While FIG. 2 shows the migration of a software resource 206a/206b, the present invention may also be applied to the movement/migration of a hardware resource. That is, rather than sending a software resource from one location to another, a hardware resource may be removed from one location to another. For example, assume that a hardware resource 214 (e.g., a processor, a storage device, a memory, etc.) is physically moved from Zone A (e.g., within the server 253a) to Zone B (e.g., within the server 253b). However, hardware resource 214 may not be authorized to operate within Zone B and/or server 253b.

In either scenario (in which a software resource or a hardware resource is migrated from one location/zone to another location/zone), one or more embodiments of the present invention determine where the migrated software/hardware resource is actually located by using location-specific decryption information.

For example, assume first that the computer resource being migrated is the software resource 206a shown in FIG. 2. Assume further that the packet header of the packet that transported the software resource 206a shows a final destination node as being an authorized location (e.g., location 216, also referred to in FIG. 2 as Zone C). Assume now that the software resource 206a was actually sent to Zone B, despite the fact that the altered packet header shows that the final destination was Zone C. The managing computer 201 (analogous to computer 101 shown in FIG. 1) would not initially know that the packet header had been altered without further processing. One or more embodiments of the present invention perform such processing.

That is, in one or more embodiments of the present invention, each zone (Zone A, Zone B, Zone C) is assigned a particular encryption/decryption process that utilizes certain encryption algorithms, protocols, keys, etc. (some or all of which are referred to herein as "encryption information" and/or "decryption information").

Assume now that managing computer 201 receives a message from server 253b stating 1) that server 253b has received software resource 206a (now shown as software resource 206b), which is true, and 2) that server 253b is within Zone C, which is false, since server 253b is actually within Zone B. In order to determine whether or not server 253b is falsifying the message about which zone it is within, managing computer 201 will request encrypted data from server 253b. In one or more embodiments of the present invention, it does not matter what the data is, just that it is encrypted by the encryption information (program, algorithm, keys, etc.) that is authorized for the zone in which the software resource 206b is located.

That is, when a zone is set up (i.e., a cluster of software and/or hardware resources within Zone A, Zone B, Zone C, etc.), a specific encryption protocol will be set for that specific zone. That protocol is specific for that zone only, and any attempt to import other encryption protocols into that zone will be blocked by a managing computer (e.g., managing computer 201). Thus, any system within Zone A will use a particular encryption/decryption program, public/private keys, algorithm, protocol, etc., while any system within Zone B will use another encryption/decryption program, public/private keys, algorithm, protocol, etc., and any system within Zone C will use yet another encryption/decryption program, public/private keys, algorithm, protocol, etc.

In the example shown in FIG. 2, server 253b will then send the encrypted data to the managing computer 201. However, since the server 253b has (falsely) told the managing computer 201 that it is in Zone C, when managing computer 201 tries to decrypt the encrypted data using the decryption information for Zone C, the decryption will fail (since the data was encrypted using encryption information specific for Zone B). The managing computer 201 will then know that the software resource 206b is not in Zone C (even if it doesn't know which zone software resource 206b is actually within), and will send instructions back to the server 253*b* to apply a geolocation based resource policy to alter the software resource 206*b* (e.g., delete software resource 206*b*, redact software resource 206*b*, modify a resource (e.g., a virtual machine) that is created by software resource 206*b*, etc.).

A similar process will execute if hardware resource 214 falsifies which zone it has been moved to. For example, assume that hardware resource 214 has been moved to a cloud-based hardware resource pool, a new blade slot in a blade chassis, or the depicted server 253*b* in FIG. 2. The managing computer 201 receives a message (e.g., from server 253*b*) that hardware resource 214 has been moved into server 253*b*. Alternatively, managing computer 201 may poll each zone and/or server (e.g., from servers 253*a*-253*b*) under its management for a listing of hardware resources within each zone. Server 253*b* would then respond with a message identifying hardware resource 214 as residing within server 253*b*.

However, as with the example discussed above with regard to the software resource 206*b*, server 253*b* will also falsify which zone it and hardware resource 214 are located. That is, server 253*b* will tell managing computer 201 that it and hardware resource 214 are within Zone C, within which hardware resource 214 (e.g., a proprietary processor, a storage device holding classified information, etc.) is authorized to operate. However, managing computer 201 will then direct the server 253*b* to encrypt some data (in one or more embodiments it is irrelevant what the data is, so long as it is sensible (e.g., readable words) and not illogical gibberish (e.g., meaningless strings of characters) when decrypted). When the managing computer 201 attempts to decrypt the encrypted data using the encryption/decryption information designated for use in decrypting data from authorized Zone C, it will not be able to, since the server 253*b* had to encrypt the data using encryption information designated for use within unauthorized Zone B.

Once a determination is made that the software resource 206*a*/206*b* and/or hardware resource 214 has in fact not moved from Zone A to Zone C, various modifications/actions are performed on software resource 206*b* and/or hardware resource 214.

For example, and in one embodiment of the present invention, in response to determining that software resource 206*b* is in Zone B, managing computer 201 (through whom all requests for software resource 206*b* are handled) will refuse to provide software resource 206*b* to the requester.

In another embodiment of the present invention, in response to determining that software resource 206*b* is in Zone B, managing computer 201 will modify software resource 206*b* before sending it to the requester. For example, if software resource 206*b* is an electronic medical record (EMR), then managing computer 201 may redact certain privileged/sensitive data from the EMR before sending it to the requester.

In another embodiment of the present invention, assume that the software resource 206*b* is a virtual machine, and Zone B only has resources capable of supporting a certain version of the virtual machine. In this scenario, the virtual machine will be modified accordingly by the managing computer 201. For example, within Zone B there may be fewer processors, less storage space, etc. than are available within Zone A. As such, the virtual machine will be modified to be less powerful in Zone B (e.g., has less bandwidth, is capable of executing fewer instructions per second, etc.) than it was when configured for Zone A.

In an embodiment in which the computer resource being altered by the various modifications/actions (e.g., due to not being within Zone C) is a hardware resource 214, such modifications/actions include, but are not limited to turning off the hardware resource 214; adjusting up or down the bandwidth, instructions per second, etc. of the hardware resource 214 (when hardware resource 214 is a processor); adjusting storage capacity, security, partitioning, etc. of the hardware resource 214 (when hardware resource 214 is a storage device), etc.

Figure 3:
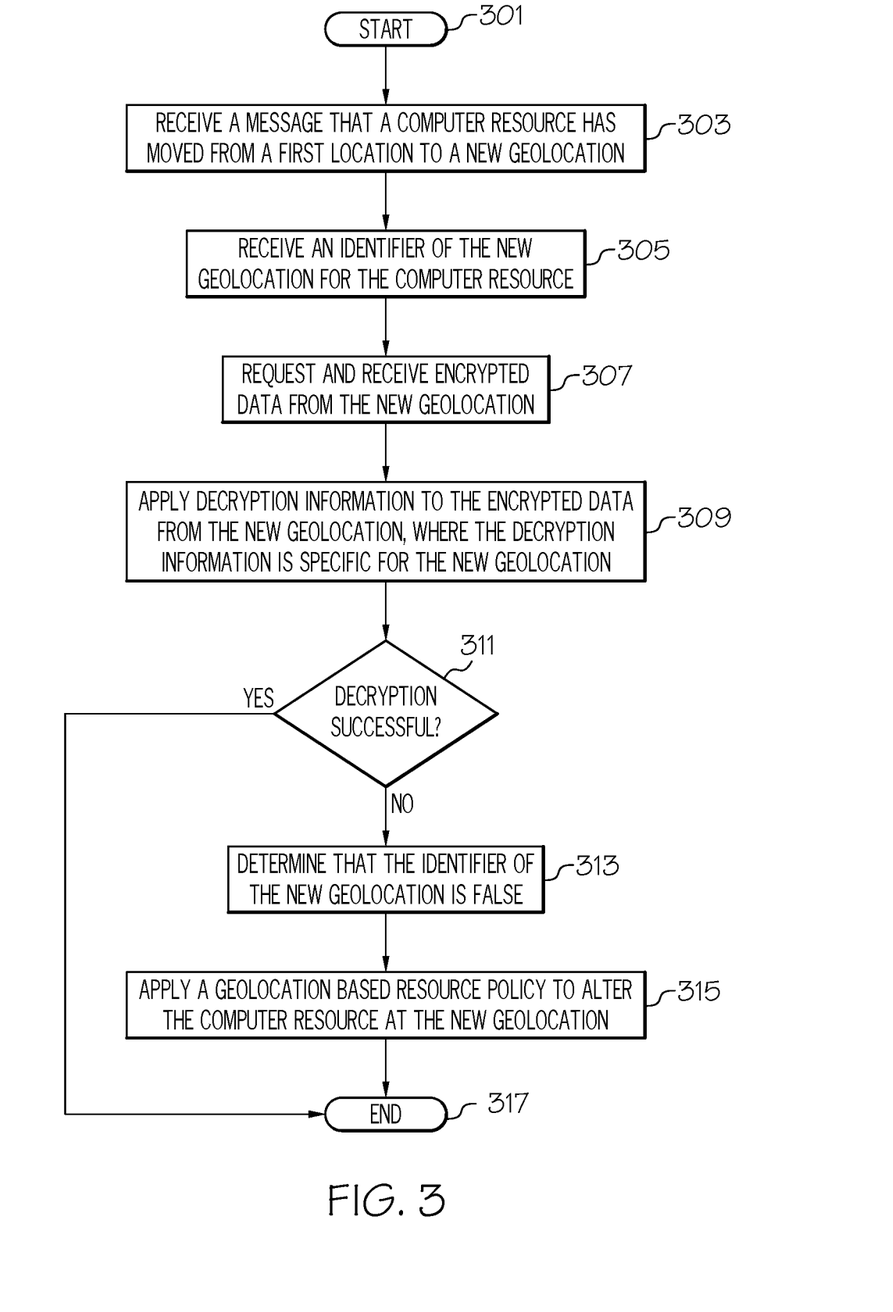
FIG. 3 is a high-level flow chart of one or more steps performed by one or more processors and/or other hardware devices to modify a computer resource that has been moved to a new geolocation.

With reference now to FIG. 3, a high-level flow chart of one or more steps performed by one or more processors and/or other hardware devices to modify a computer resource that has been moved to a new geolocation is presented.

After initiator block 301, one or more processors (e.g., within managing computer 201 shown in FIG. 2) receive a message that a computer resource (e.g., software resource 206*a* and/or hardware resource 214 shown in FIG. 2) has moved from a first geolocation (e.g., server 253*a*) to a new geolocation (e.g., server 253*b*), as described in block 303.

As described in block 305, the processor(s) receive (e.g., from server 253*b* shown in FIG. 2) an identifier of the new geolocation (e.g., "Zone C") for the computer resource.

As described herein, in one embodiment of the present invention the identifier of the new geolocation is generated by a global positioning system (GPS) sensor (e.g., geolocation sensor 251*b* shown in FIG. 2) that is in communication with a GPS satellite (e.g., GPS satellite 210 shown in FIG. 2), where the GPS sensor is associated with the computer resource (i.e., is part of the system such as server 253*b* that holds the migrated software resource 206*b* and/or hardware resource 214).

As described herein, in one embodiment of the present invention the identifier of the new geolocation is taken from a transmission path shown in a packet header of a packet used to migrate the (software) computer resource to the new geophysical location.

As described in block 307, in response to receiving the identifier of the new geolocation for the computer resource, the processor(s) request and receive encrypted data from the new geolocation. That is, the managing computer 201 will request that the host (e.g., server 253*b*) of the newly-migrated computer resource identify the location/zone in which the newly-migrated computer resource is located. More specifically and in one or more embodiments, in response to receiving the identifier of the new geolocation for the computer resource, the processor(s) will apply a data remanence policy on data that was stored on the computer resource while at the first geolocation. This data remanence policy may direct that the data that was stored on the computer resource while at the first location (and still remains on the computer resource after being moved to the new location), should now be encrypted or otherwise protected (e.g., placed behind a firewall) while the computer resource is at the new location. Thus, in one embodiment, applying the data remanence policy causes the data on the computer resource to be encrypted while at the new geolocation in order to create encrypted data on the computer resource.

As described in block 309, the processor(s) apply decryption information to the encrypted data from the new geolocation. As described above, the decryption information is specific for each geolocation/zone, including the new geolocation.

As described in query block 311, a query is made by the processor(s) as to whether the decryption information used (for the identified new geolocation) was able to decrypt the encrypted data from the new geolocation. If not, then the processor(s) determine that the identifier of the new geolocation is false (e.g., the migrated resource is not in Zone C as reported by server 253b), as described in block 313.

As described in block 315, the processor(s) then apply a geolocation based resource policy to alter the computer resource at the new geolocation.

In an embodiment of the present invention, the computer resource is an electronic database, such that applying the geolocation based resource policy deletes at least a portion of data in the electronic database. For example, assume that the electronic database is in a restricted zone. As such, the processor(s) will delete any sensitive data (due to enterprise policies, regulations, laws, etc.) that are not permitted to be electronically stored within that restricted zone. Alternatively, such sensitive data may be encrypted by the processor(s).

In an embodiment of the present invention, if the computer resource has been moved, then the managing computer will track the identity of anyone who attempts to retrieve it after it has been moved. That is, in an embodiment of the present invention the computer resource is an electronic database in a database server, such that applying the geolocation based resource policy causes the database server to: capture an identity of a requester of data from the electronic database; block access by the requester to the electronic database; and report the identity of the requester to a security management system.

In an embodiment of the present invention and as described herein, the computer resource is a virtual machine (VM), and applying the geolocation based resource policy reduces a functionality of the VM (i.e., reduces its bandwidth, decreases the instructions per second that it can process, etc. based on available supporting resources in the new location).

In an embodiment of the present invention, the computer resource is an application, and applying the geolocation based resource policy reduces a functionality of the application. For example, if the application has features A, B, and C while maintained within Zone A shown in FIG. 2, it may be modified to only have the features of A and C while outside of Zone A (or Zone C). That is, assume that the software resource 206a/206b shown in FIG. 2 is a controller for a petrochemical refinery. While in Zone A or Zone C, software resource 206a will be able to control all actuators, fire up all furnaces, etc., as well as report conditions within a petrochemical refinery. However, while outside of Zone A or Zone C, software resource 206b will only be able to report conditions within the petrochemical refinery, and will not be able to control actuators, furnaces, etc.

In an embodiment of the present invention, the computer resource is an electronic database in a database server, and applying the geolocation based resource policy causes the database server to: delete an unauthorized portion of the electronic database, where the unauthorized portion has been predetermined to be unauthorized to be stored at the new geolocation; and retain an authorized portion of the electronic database, where the authorized portion has been predetermined to be authorized to be stored at the new geolocation. That is, when software resource 206a moves to Zone B (thus becoming software resource 206b), some of the data will remain within software resource 206b while other data within software resource 206a will be deleted from software resource 206b, since the software resource 206b is no longer within Zone A nor is it within Zone C. Alternatively, applying the geolocation based resource policy encrypts at least a portion of data in the electronic database.

In an embodiment of the present invention, the computer resource is an electronic database in a database server, and applying the geolocation based resource policy causes the database server to label data from the electronic database with a sensitivity level tag, where the sensitivity level tag is based on a current geolocation of the database. That is, assume that data from software resource 206a is never sensitive as long as it is in Zone A. However, as soon as software resource 206a migrates to Zone B (thus becoming software resource 206b), some of the data becomes "sensitive", due to legal restrictions, enterprise rules, etc. that are applicable to Zone B. At that point, the managing computer 201 will label the data that is now "sensitive" accordingly.

In an embodiment of the present invention, the computer resource is an electronic database, the geolocation based resource policy defines a state of availability for the data from the electronic database based on a current geolocation, and the state of availability is from a group consisting of the data being unencrypted, the data being encrypted, and the data being unavailable in any form. That is, based on where the software resource (e.g., data) has been migrated to, that data may remain unencrypted, may be encrypted, or may be blocked from access at all, depending on the location at which it is currently residing (after migration).

The flow chart ends at terminator block 317.

In one or more embodiments of the present invention, the computer resource is a hardware device in a cloud-based hardware resource center or a software resource in a cloud-based center.

As such, the present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
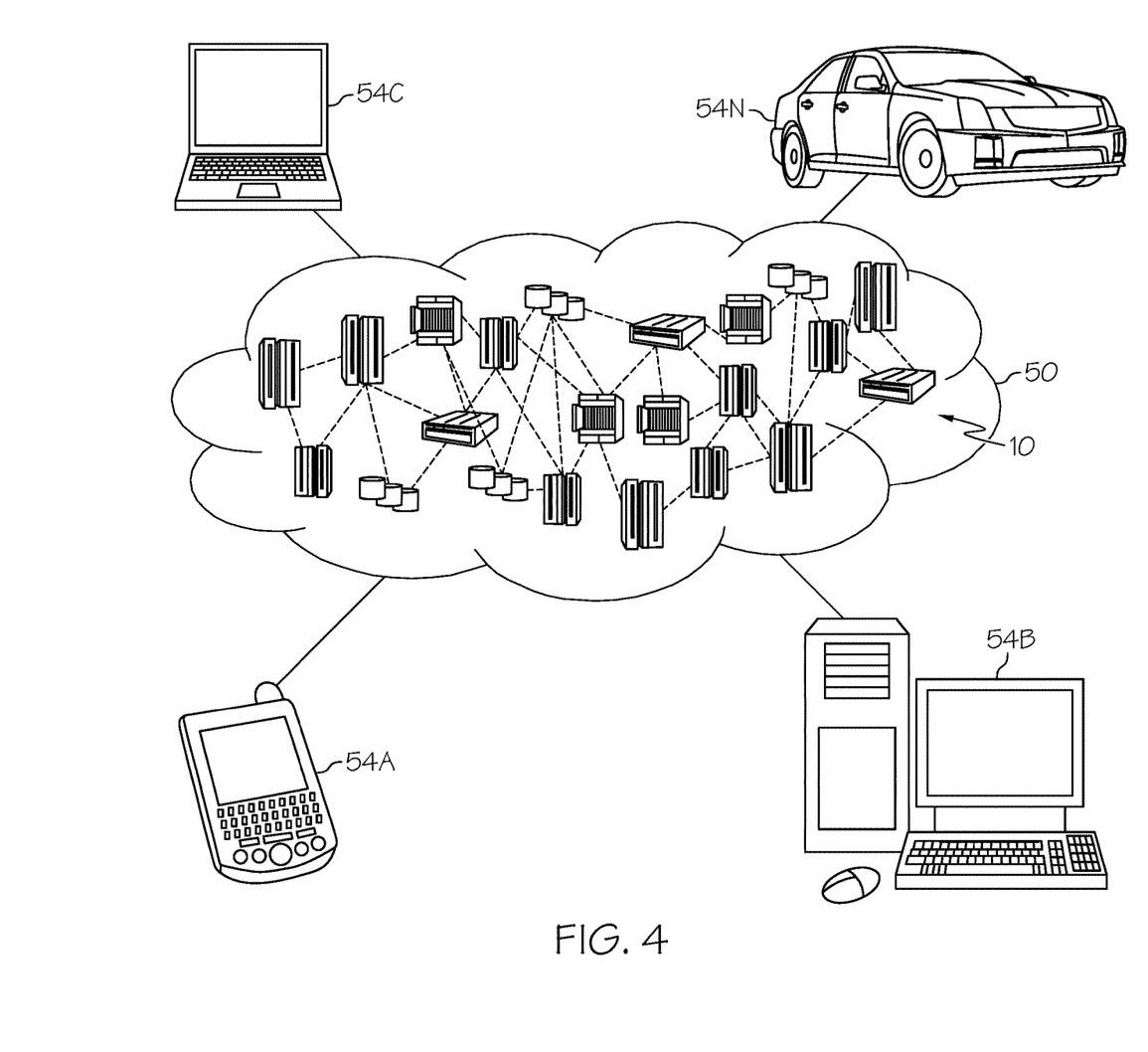
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 4 are intended to be illustrative only and that computing nodes 10 and cloud computing environment 50 can communicate with any type of computerized device over any type of network and/or network addressable connection (e.g., using a web browser).

Figure 5:
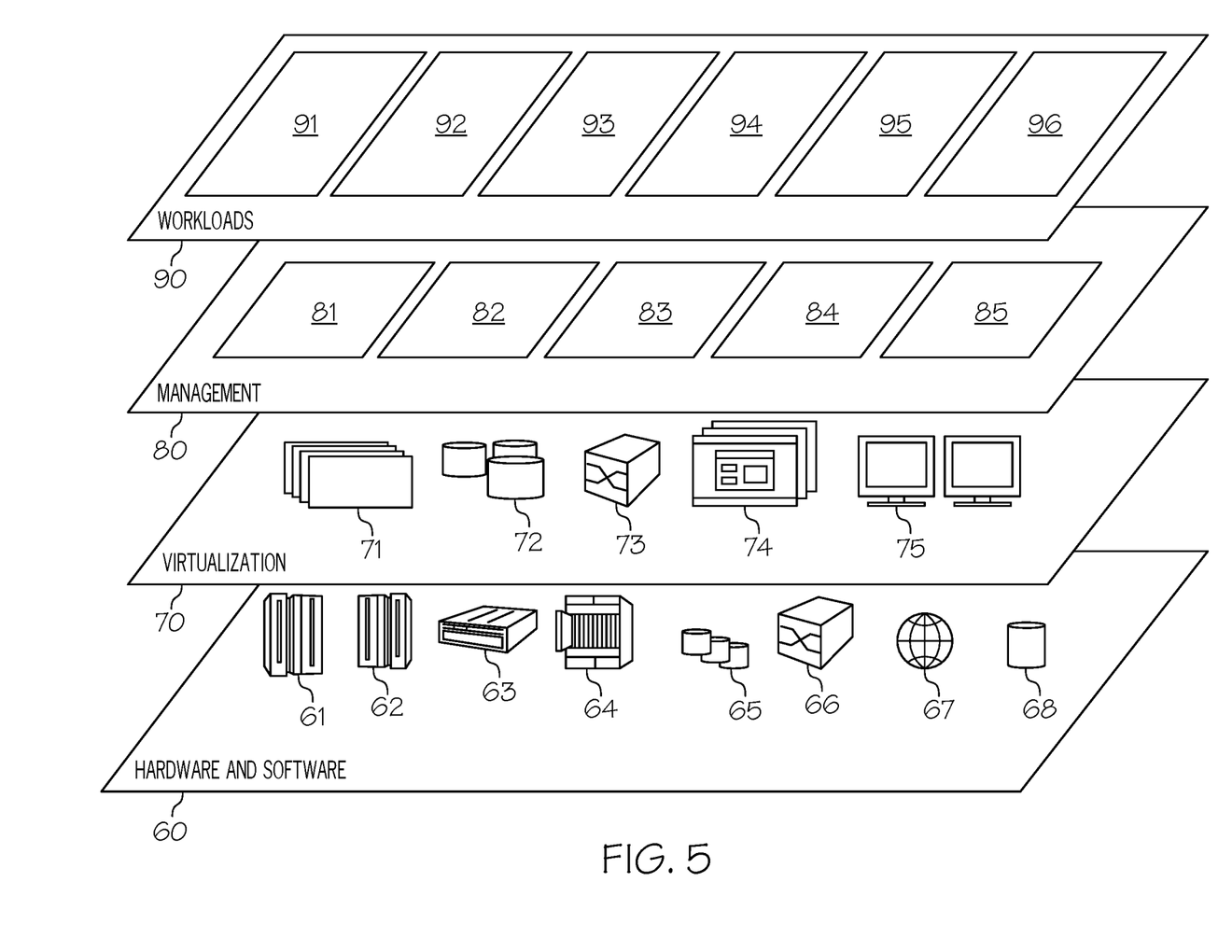
FIG. 5 depicts abstraction model layers of a cloud computer environment according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and computer resource modification processing 96 to modify a computer resource that has been moved to a new geolocation in accordance with one or more embodiments of the present invention as described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   receiving a message that a computer resource has moved from a first geolocation to a new geolocation;
   in response to receiving the message that the computer resource has moved from the first geolocation to the new geolocation, encrypting, by one or more processors, data that is stored on the computer resource;
   applying, by one or more processors, decryption information to the encrypted data from the new geolocation, wherein the decryption information is specifically for decrypting encrypted data at the new geolocation; and
   in response to the decryption information failing to decrypt the encrypted data at the new geolocation, altering the computer resource.

2. The method of claim 1, wherein the computer resource is a hardware device.

3. The method of claim 1, wherein the computer resource is a software resource.

4. The method of claim 1, wherein the computer resource is an electronic database, and wherein altering the computer resource deletes at least a portion of data in the electronic database.

5. The method of claim 1, wherein the computer resource is an electronic database, and wherein altering the computer resource encrypts at least a portion of data in the electronic database.

6. The method of claim 1, wherein the computer resource is an electronic database in a database server, and wherein altering the computer resource causes the database server to:
   capture an identity of a requester of data from the electronic database;
   block access by the requester to the electronic database; and
   report the identity of the requester to a security management system.

7. The method of claim 1, wherein the computer resource is a virtual machine (VM), and wherein altering the computer resource reduces a functionality of the VM.

8. The method of claim 1, wherein the computer resource is an application, and wherein altering the computer resource reduces a functionality of the application.

9. The method of claim 1, wherein the computer resource is an electronic database in a database server, and wherein altering the computer resource causes the database server to:
   delete an unauthorized portion of the electronic database, wherein the unauthorized portion has been predetermined to be unauthorized to be stored at the new geolocation; and
   retain an authorized portion of the electronic database, wherein the authorized portion has been predetermined to be authorized to be stored at the new geolocation.

10. The method of claim 1, wherein the computer resource is an electronic database in a database server, and wherein altering the computer resource causes the database server to:
    label data from the electronic database with a sensitivity level tag, wherein the sensitivity level tag is based on a current geolocation of the electronic database.

11. The method of claim 1, wherein the computer resource is a hardware device in a cloud-based hardware resource center.

12. The method of claim 1, wherein the computer resource is a software resource in a cloud-based center.

13. A computer program product comprising one or more non-transitory computer readable storage mediums, and program instructions stored on at least one of the one or more non-transitory computer readable storage mediums, the stored program instructions comprising:
    program instructions to receive a message indicating that a computer resource has moved from a first geolocation to a new geolocation;
    program instructions to, in response to receiving the message that the computer resource has moved from the first geolocation to the new geolocation, encrypt data that is stored on the computer resource;
    program instructions to apply decryption information to the encrypted data from the new geolocation, wherein the decryption information is specifically for decrypting encrypted data at the new geolocation; and
    program instructions to, in response to the decryption information failing to decrypt the encrypted data at the new geolocation, alter the computer resource.

14. The computer program product of claim 13, wherein the computer resource is a hardware device.

15. The computer program product of claim 13, wherein the computer resource is a software resource.

16. The computer program product of claim 13, wherein the computer resource is a hardware device in a cloud-based hardware resource center.

17. The computer program product of claim 13, wherein the computer resource is a cloud-based electronic database, and wherein applying the geolocation based resource policy deletes at least a portion of data in the cloud-based electronic database.

18. A computer system comprising:
one or more processors;
one or more computer readable memories; and
one or more non-transitory computer readable storage mediums, wherein program instructions are stored on at least one of the one or more non-transitory computer readable storage mediums, wherein the program instructions are executed by at least one of the one or more processors via at least one of the one or more computer readable memories, and wherein the stored program instructions comprise:
   program instructions to receive a message indicating that a computer resource has moved from a first geolocation to a new geolocation;
   program instructions to, in response to receiving the message that the computer resource has moved from the first geolocation to the new geolocation, encrypt data that is stored on the computer resource;
   program instructions to apply decryption information to the encrypted data from the new geolocation, wherein the decryption information is specifically for decrypting encrypted data at the new geolocation; and
   program instructions to, in response to the decryption information failing to decrypt the encrypted data at the new geolocation, alter the computer resource.

19. The computer system of claim 18, wherein the computer resource is an electronic database in a cloud server, and wherein altering the computer resource causes the cloud server to:
   delete an unauthorized portion of the electronic database, wherein the unauthorized portion has been predetermined to be unauthorized to be stored at the new geolocation; and
   retain an authorized portion of the electronic database, wherein the authorized portion has been predetermined to be authorized to be stored at the new geolocation.

20. The computer system of claim 18, wherein the computer resource is a hardware device in a cloud-based hardware resource center.

* * * * *